United States Patent
Wang et al.

(10) Patent No.: US 10,841,408 B2
(45) Date of Patent: Nov. 17, 2020

(54) ELECTRONIC DEVICE WITH DEPLOYABLE AND RETRACTABLE CAMERA ASSEMBLY

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Min-Yue Wang, Shenzhen (CN); Xiao-Yi Qiu, Shenzhen (CN); He Zhou, Shenzhen (CN); Yong Zhao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/421,868

(22) Filed: May 24, 2019

(65) Prior Publication Data

US 2020/0220955 A1    Jul. 9, 2020

(30) Foreign Application Priority Data

Jan. 9, 2019    (CN) .......................... 2019 1 0021165

(51) Int. Cl.
*H04M 1/00*    (2006.01)
*H04M 1/02*    (2006.01)
*G03B 29/00*    (2006.01)
*G06F 1/16*    (2006.01)

(52) U.S. Cl.
CPC .......... *H04M 1/0264* (2013.01); *G03B 29/00* (2013.01); *G06F 1/1656* (2013.01); *G06F 1/1675* (2013.01); *G06F 1/1686* (2013.01); *G06F 1/1626* (2013.01)

(58) Field of Classification Search
CPC .. G06F 1/1626; H04B 1/3888; H04M 1/0237; H04M 1/0214; H04M 1/72519; H04M 1/72522
USPC ..................... 455/550.1, 575.1, 575.4, 575.8
See application file for complete search history.

(56) References Cited

U.S. PATENT DOCUMENTS

| | | | |
|---|---|---|---|
| 7,187,957 B2* | 3/2007 | Kato ..................... | H04M 1/021 348/333.06 |
| 10,142,525 B2* | 11/2018 | Tachikawa ........... | H04N 5/2252 |
| 2012/0231859 A1* | 9/2012 | Makino ............... | H04M 1/0216 455/575.4 |
| 2017/0064166 A1* | 3/2017 | Xiong .................. | G03B 11/043 |
| 2018/0227401 A1* | 8/2018 | DiLaura ................ | A45C 15/00 |
| 2018/0245880 A1* | 8/2018 | Campbell ............... | F41G 1/473 |

* cited by examiner

*Primary Examiner* — Matthew W Genack
(74) *Attorney, Agent, or Firm* — ScienBiziP, P.C.

(57) ABSTRACT

An electronic device with movable camera assembly which can be deployed and retracted so as to allow a display screen of maximum size on a front surface of the device includes a main body and a camera assembly. The main body includes a front surface with a display screen and a back surface. The back surface defines a recess receiving the camera assembly. The camera assembly is mounted on a carrier. The carrier-mounted camera assembly appears from or above the front surface when deployed by being slid upwardly or outwardly by a user, the camera assembly can then be pushed back in.

11 Claims, 6 Drawing Sheets

ELECTRONIC DEVICE WITH DEPLOYABLE AND RETRACTABLE CAMERA ASSEMBLY

FIELD

The subject matter herein generally relates to imaging by portable devices.

BACKGROUND

Smart devices such as mobile phones with "all screen" or "infinity display" are popular. A front camera on the front surface of the smart device where the display screen is also located limits a size of the display screen.

Therefore, there is room for improvements.

BRIEF DESCRIPTION OF THE DRAWINGS

Implementations of the present technology will now be described, by way of embodiments, with reference to the attached figures.

DETAILED DESCRIPTION

The present disclosure is made in conjunction with the accompanying drawings. Specific embodiments of the present disclosure are described.

In the following description, when an element is described as being "fixed to" another element, the element can be fixed to the another element with or without intermediate elements. When an element is described as "connecting" another element, the element can be connected to the another element with or without intermediate elements.

Without a given definition, all terms used have the same meaning as commonly understood by those skilled in the art. The term "and/or" means including any and all combinations of one or more of associated listed items.

Figure 1:
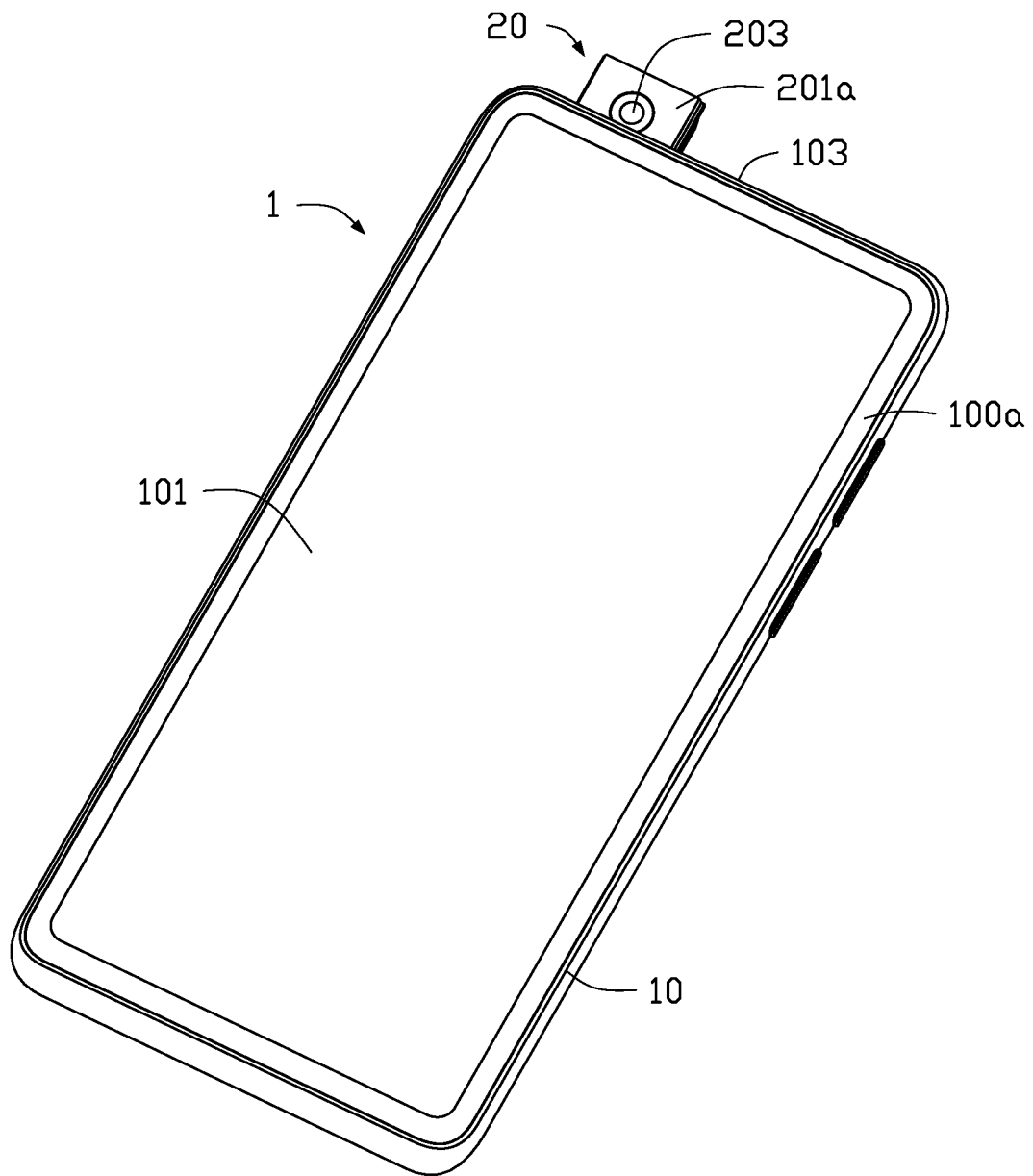
FIG. 1 is an isometric view of an electronic device with a deployable and retractable camera assembly according to an embodiment of the present disclosure with the camera assembly being deployed.
Figure 2:
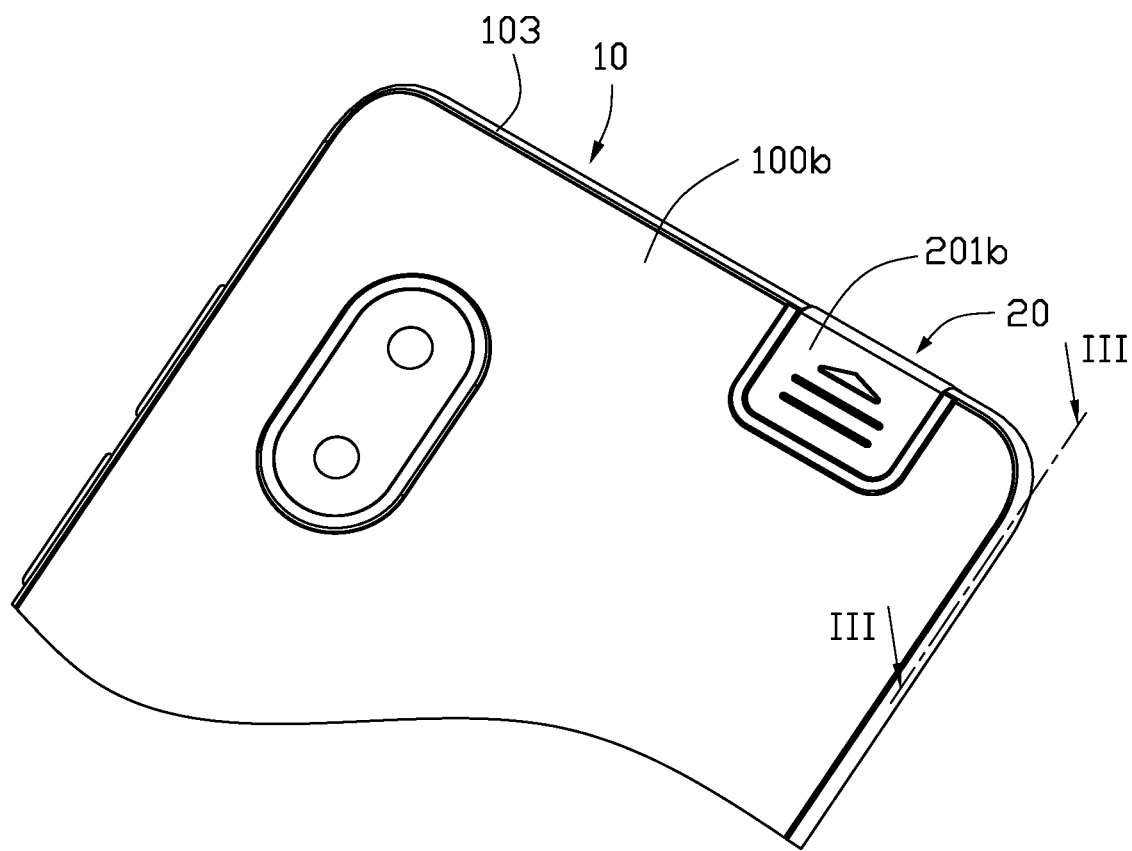
FIG. 2 is an isometric view of part of the electronic device of FIG. 1 with the camera assembly being retracted.

FIG. 1 shows an electronic device (electronic device 1) according to an embodiment. The electronic device 1 is a smart device provided with a camera assembly, the electronic device 1 can be a mobile phone, a tablet computer, or the like. Referring also to FIG. 2, in the embodiment, the electronic device 1 is a mobile phone. The electronic device 1 includes a main body 10 and a camera assembly 20. The main body 10 includes a front surface (hereinafter "the first front surface 100a") provided with a display screen 101 and a back surface (hereinafter "the first back surface 100b") opposite to the first front surface 100a. The camera assembly 20 is mounted on the first back surface 100b. The camera assembly 20 can be moved to protrude out from the main body 10 and be visible from a front side of the electronic device 1, so that the camera assembly 20 can be a front camera and take pictures.

Figure 5:
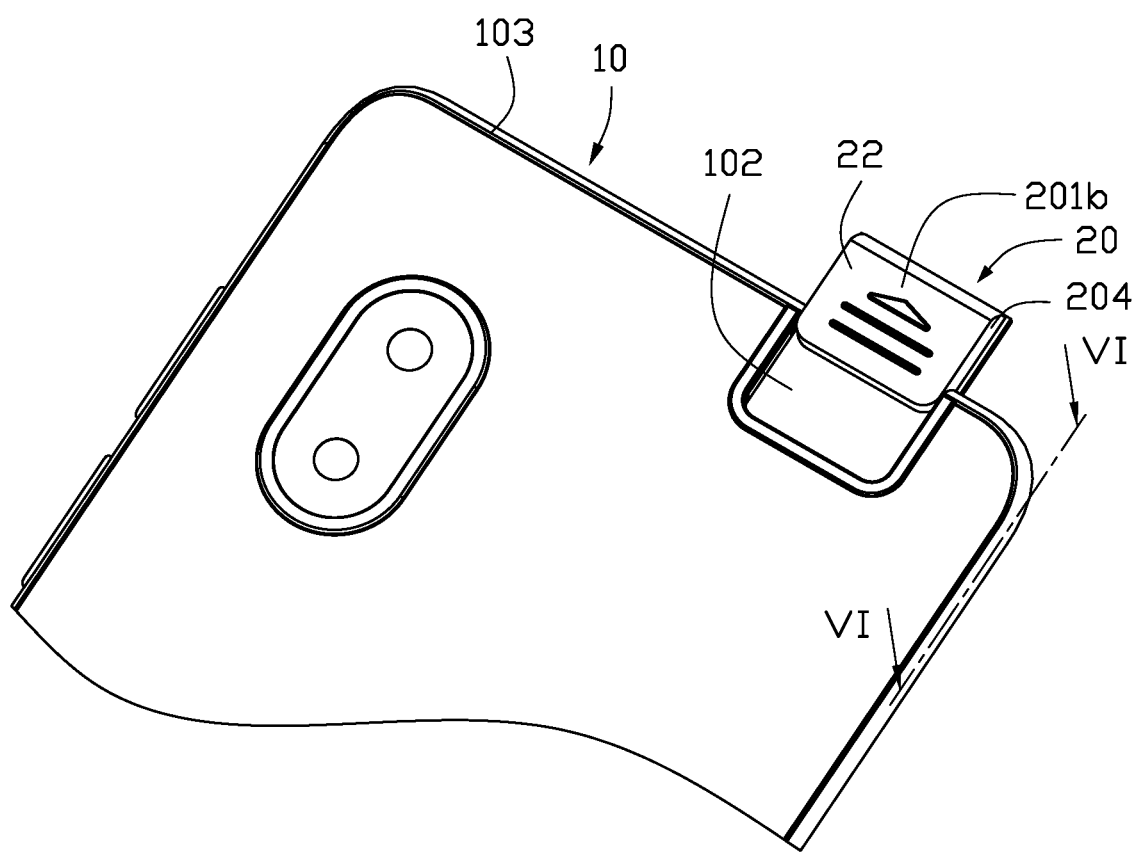
FIG. 5 is an isometric view of the electronic device of FIG. 1 with the camera assembly being deployed.

Referring to FIGS. 2 and 5, the camera assembly 20 is movably connected to the main body 10. A recess 102 is defined on the first back surface 100b of the main body 10 for receiving the camera assembly 20. The recess 102 is located near an edge 103 of the main body 10.

Figure 3:
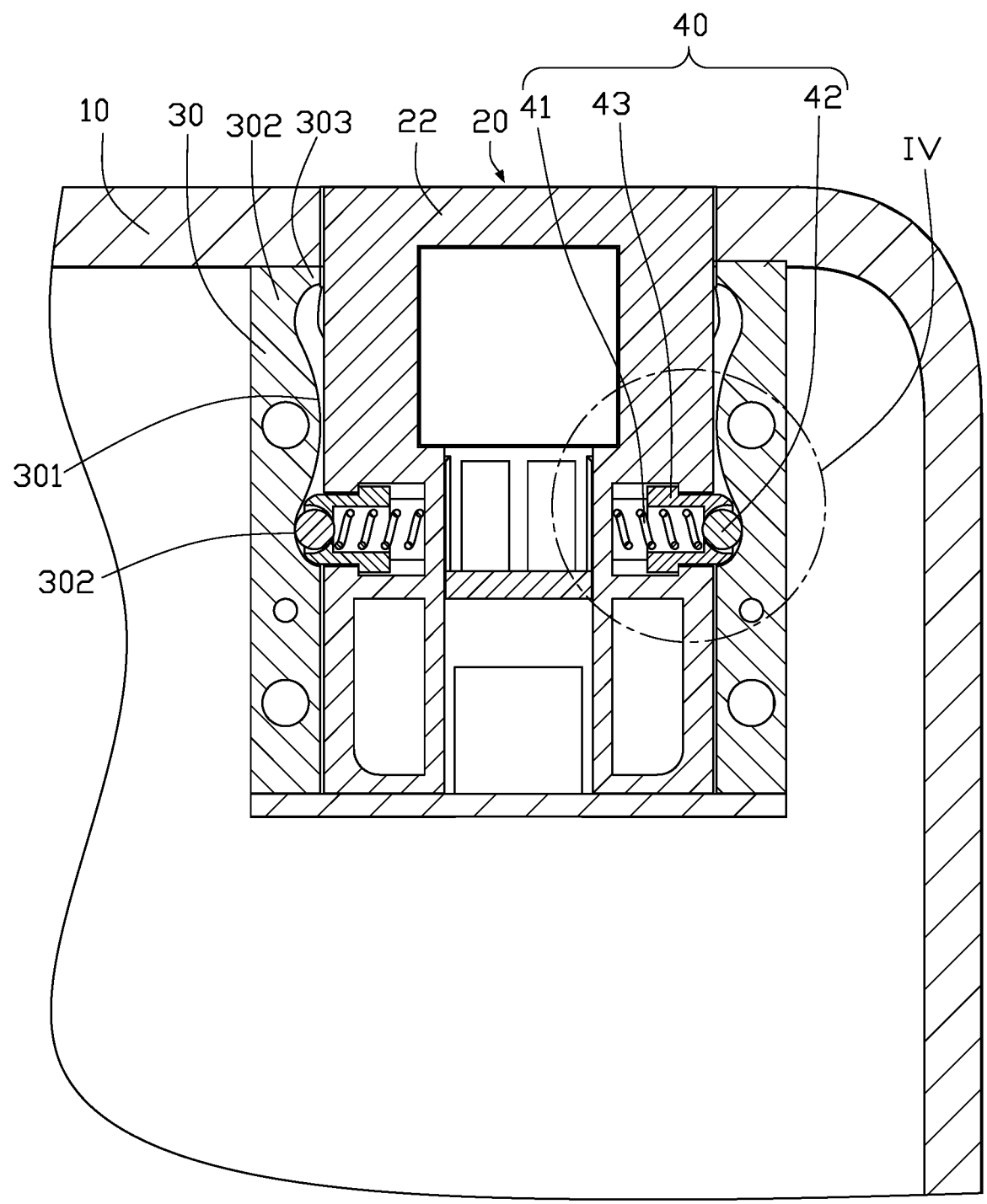
FIG. 3 is a cross-sectional view along line III-III of FIG. 2.
Figure 4:
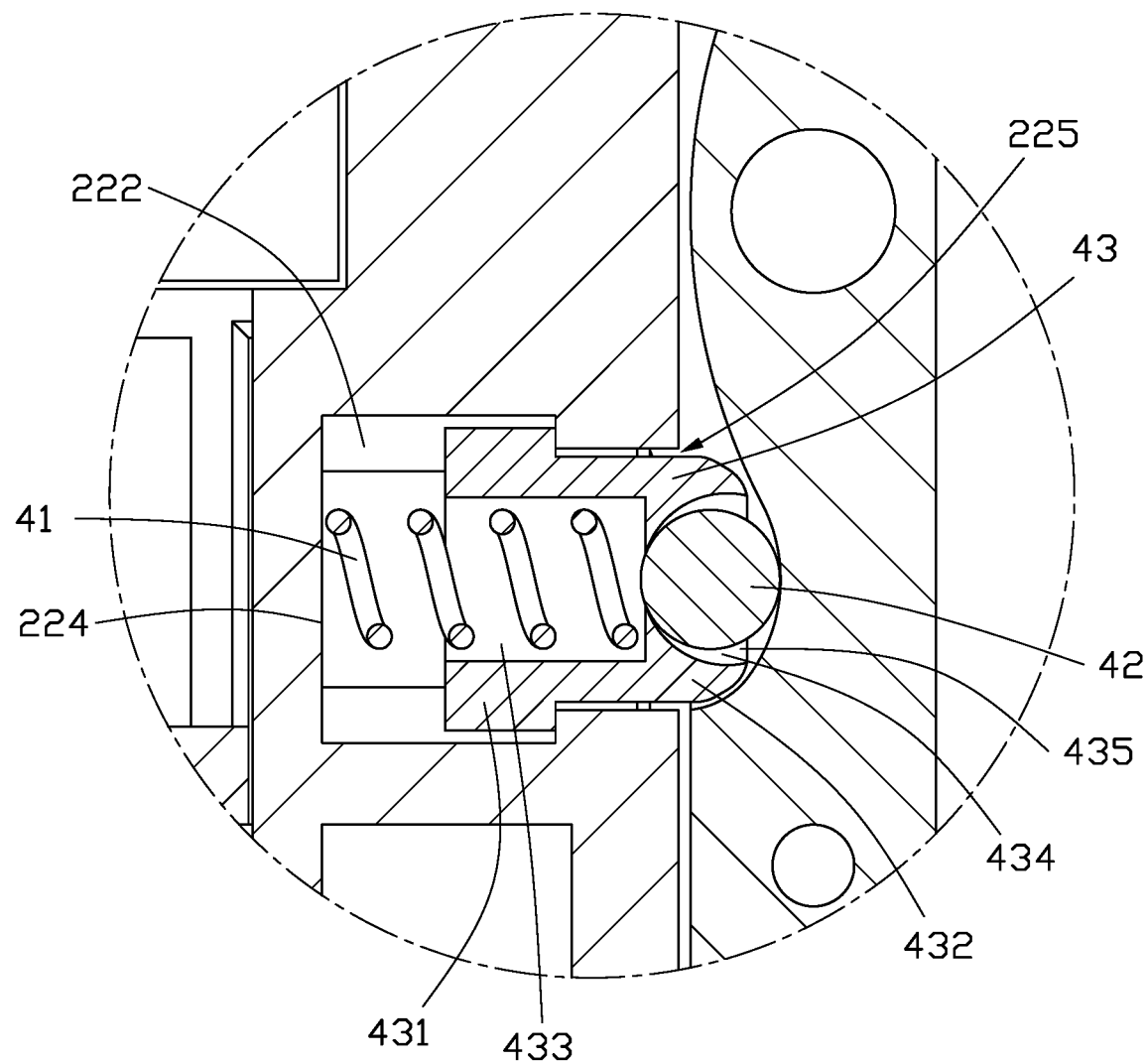
FIG. 4 is an enlarged view of circular portion IV of FIG. 3.

Referring to FIG. 3 and FIG. 4, the camera assembly 20 includes a carrier 22 and a camera module 203 carried by the carrier 22. The carrier 22 includes a front surface (hereinafter "the second front surface 201a") and a back surface (hereinafter "the second back surface 201b") opposite to the second front surface 201a. The camera module 203 is mounted on the carrier 22 and appears from the second front surface 201a of the carrier 22. The carrier 22 further includes at least two opposite sidewalls 204. The sidewalls 204 connect the second front surface 201a with the second back surface 201b. At least one of the sidewalls 204 defines a groove 222. In the embodiment, each sidewall 204 defines a groove 222. The groove 222 extends from the sidewall 204 toward inside of the carrier 22 and forms a bottom 224 in the carrier 22. The bottom 224 faces an opening (hereinafter "the first opening 225") of the groove 222.

The electronic device 1 further includes at least one sliding assembly 40 and at least one sliding rail 30. The sliding assembly 40 is received in the groove 222 and is slidable along the sliding rail 30. The sliding rail 30 is mounted or formed in the recess 102 and extends toward the edge 103 of the main body 10, so that the camera assembly 20 can slide out from the edge 103 of the main body 10.

In an embodiment, the electronic device 1 includes two sliding assemblies 40 and two sliding rails 30. The sliding rails 30 are spaced and opposite to each other. The camera assembly 20 is received between the sliding rails 30. Each sliding assembly 40 is received in the groove 222 and engages with a sliding rail 30. At least one of the sliding rails 30 has a curved shape so that a distance between the sliding rails 30 changes as the sliding rails 30 extends. When the camera assembly 20 is slid along the sliding rails 30, the sliding assemblies 40 and the camera assembly 20 are subjected to different resistances so that inertias and operational sensation felt by a user are improved. In the embodiment, the distance between the sliding rails 30 is shorter in a middle portion 301 and longer in end portions 302. After sliding over the middle portion 301 of the sliding rails 30, the sliding assemblies 40 can then slide under the sliding assemblies' own inertia and do not need to be pushed further.

Each sliding assembly 40 includes an elastic member 41, a ball 42, and a connecting member 43. The connecting member 43 includes a first end 431 facing the bottom 224 of the groove 222 and a second end 432 opposite to the first end 431. The elastic member 41 is compressed between the first end 431 and the bottom 224 of the groove. In this embodiment, the first end 431 of the connecting member 43 is recessed to form a cavity 433 for receiving an end of the elastic member 41. The ball 42 is mounted at the second end 432 of the connecting member 43 and engages with the sliding rail 30. A hole 434 is defined at the second end 432 of the connecting member 43 for receiving the ball 42. The hole 434 has an opening (hereinafter "the second opening 435") facing the sliding rail 30. The ball 42 is exposed through the second opening 435 to engage with the sliding rail 30. The ball 42 rotates so that the sliding assembly 40 as well as the camera assembly 20 can slide along the sliding rail 30.

In the embodiment, the connecting member 43 has the shape of a thimble, and the elastic member 41 is a compressed spring. An end of the elastic member 41 is fixed on the connecting member 43. The compressed elastic member 41 presses against the connecting member 43 and the connecting member 43 presses against the ball 42, so that the ball 42 is forced against the sliding rail 30 as the ball 42 engages with the sliding rail 30. The sliding rail 30 being curved, a compression force by the elastic members 41 changes as the sliding assemblies 40 slides along the sliding rails 30.

A protruding bump 303 is formed at one of the end portions 302 of each sliding rails 30 near the edge 103 of the main body 10. The protruding bumps 303 protrude toward each other and prevent the sliding assemblies 40 from sliding outside of the sliding rails 30, thus preventing the camera assembly 20 from separating from the main body 10.

Figure 6:
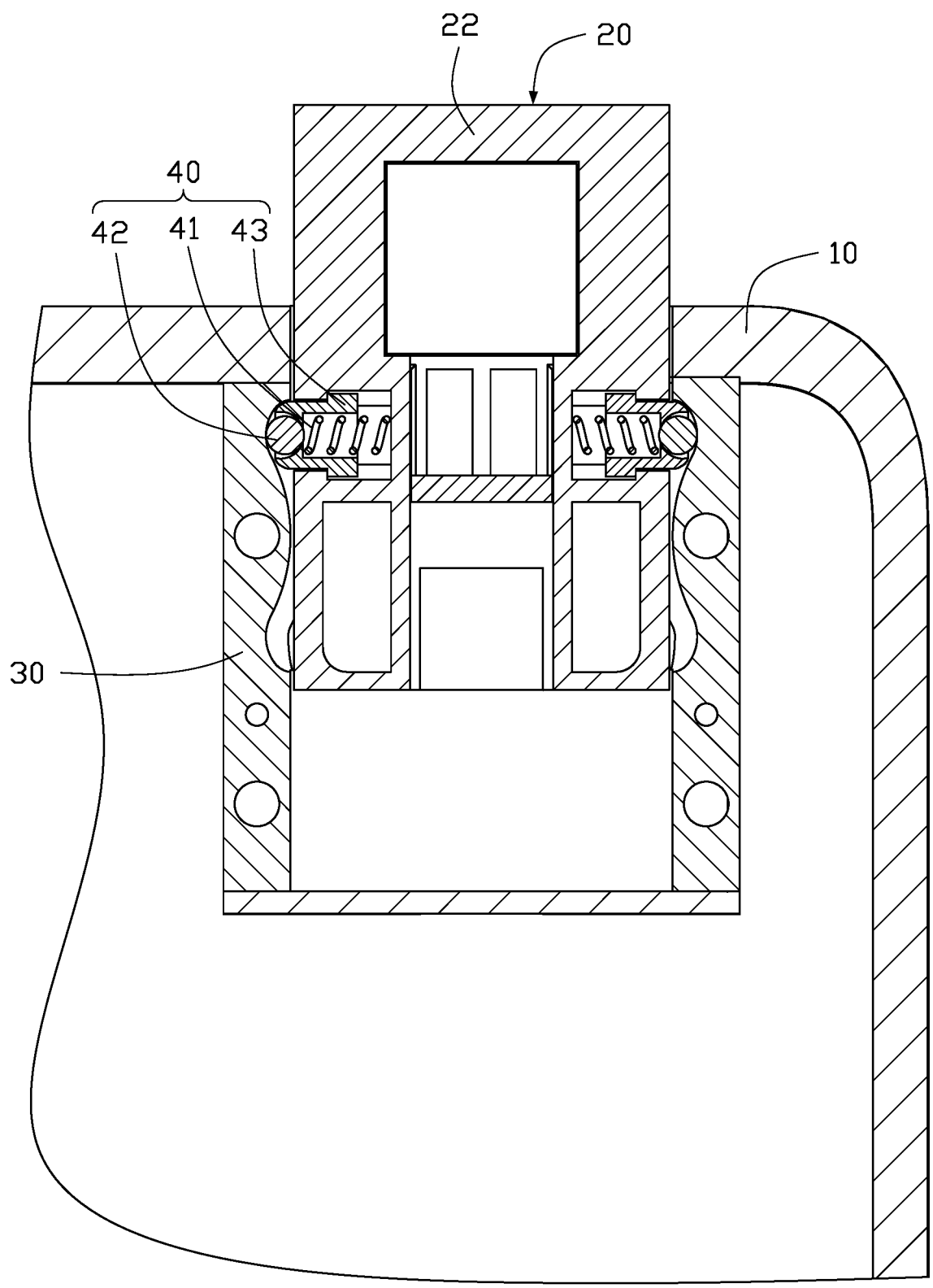
FIG. 6 is a cross-sectional view along line VI-VI of FIG. 5.

Referring to FIG. 6, when the camera module 203 is in use, the second back surface 201b can be pushed to slide the camera assembly 20 along the sliding rails 30. The camera module 203 moves across the edge 103 of the main body 10 and is positioned to take pictures of the scene in front of the electronic device 1. After use, the second back surface 201b can be pushed back to slide the camera downward or backward, so that the camera assembly 20 can be received in the recess 102. Not being mounted and fixed on the first front surface 100a of the main body 10, the camera assembly 20 does not occupy the first front surface 100a. The size of the display screen 101 on the first front surface 100a is thus not affected by the camera assembly 20 and a larger size display screen 101 can be provided on the main body 10.

In pushing out and deploying the camera assembly 20, the carrier 22 drives the balls 42 of the sliding assemblies 40 to move along the sliding rails 30. The curved sliding rails 30 change the amount of compression force by the elastic members 41 as the distance between the sliding rails 30 changes. The camera assembly 20 is subjected to different resistances and inertias, improving the haptics for users. The protruding bumps 303 prevent the camera assembly 20 from separating from the main body 10. Furthermore, the sliding in and out can be achieved manually, consuming no electric power.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. An electronic device with deployable and retractable camera assembly comprising a main body, a camera assembly, at least one sliding assembly mounted on the camera assembly, and at least one sliding rail defined on the main body, the main body comprising a first front surface provided with a display screen and a first back surface opposite to the first front surface, wherein, the first back surface defines a recess for receiving the camera assembly, the at least one sliding rail is mounted or formed in the recess and extending toward an edge of the main body, the camera assembly comprises a carrier and a camera module carried by the carrier, the carrier comprises a second front surface and a second back surface, the camera module is mounted on the carrier and viewable from the second front surface, the camera assembly comprises two sidewalls opposite to each other, at least one groove is defined on at least one of the sidewalls for receiving the at least one sliding assembly, each of the at least one groove has a bottom formed in the carrier and a first opening formed on the at least one of the sidewalls, the bottom faces the first opening, the at least one sliding assembly protrudes from the first opening and engages with the at least one sliding rail, thereby the at least one sliding assembly is slidable along the at least one sliding rail to slide the camera assembly out of or into the recess, wherein the at least one sliding rail is curved so that the at least one sliding assembly can slide under the sliding assemblies' inertia without external forces in an end portion of the at least one sliding rail.

2. The electronic device as claimed in claim 1, wherein each of the at least one sliding assembly comprises an elastic member, a ball and a connecting member, the elastic member is compressed between the connecting member and the bottom, the ball is mounted in the connecting member and engages with the at least one sliding rail, the ball rotates to slide the camera assembly along the at least one sliding rail.

3. The electronic device as claimed in claim 2, wherein the connecting member comprises a first end facing the bottom of the groove and a second end opposite to the first end, the first end is recessed to form a cavity for receiving an end of the elastic member, the ball is mounted at the second end and engages with the at least one sliding rail.

4. The electronic device as claimed in claim 3, wherein a hole is defined at the second end of the connecting member for receiving the ball, the hole has a second opening facing the at least one sliding rail, the ball exposes through the second opening to engage with the at least one sliding rail.

5. The electronic device as claimed in claim 2, wherein the elastic member presses the connecting member and the connecting member presses the ball to force the ball to abut against the at least one sliding rail and engage with the at least one sliding rail.

6. The electronic device as claimed in claim 4, wherein the connecting member has a shape of a thimble and the elastic member is a compressed spring.

7. The electronic device as claimed in claim 2, wherein the electronic device comprises two sliding rails, the sliding rails are spaced and opposite to each other, the camera assembly is received between the sliding rails.

8. The electronic device as claimed in claim 7, wherein at least one of the sliding rails is curved, wherein a distance between the sliding rails changes along an extending direction of the sliding rails and a compression force by the elastic member changes as the at least one sliding assembly slides along the sliding rails.

9. The electronic device as claimed in claim 8, wherein the distance between the sliding rails is shorter in a middle portion of the sliding rails and longer in end portions of the sliding rails.

10. The electronic device as claimed in claim 8, each of the sliding rails comprises a protruding bump formed at one of the end portions of the sliding rail near the edge of the main body, the protruding bumps protrude toward each other and prevent the at least one sliding assembly from sliding outside of the sliding rails.

11. The electronic device as claimed in claim 1, wherein the electronic device comprises two sliding rails spaced and opposite to each other, a distance between the two sliding rails in middle portions is shorter than a distance between the two sliding rails in end portions.

* * * * *